United States Patent
Koike (10) Patent No.: US 6,630,549 B1
(45) Date of Patent: Oct. 7, 2003

(54) METHOD FOR PRODUCING AN OLEFIN HOMOPOLYMER OR AN OLEFIN COPOLYMER

(75) Inventor: Tatsuya Koike, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/556,783

(22) Filed: Apr. 25, 2000

(30) Foreign Application Priority Data

Oct. 21, 1999 (JP) .......................................... 11-299186

(51) Int. Cl.⁷ .................................................. C08F 4/44
(52) U.S. Cl. ....................... 526/160; 526/943; 526/905; 526/170; 526/901; 526/919; 526/920; 526/88; 526/64
(58) Field of Search ................................ 526/905, 943, 526/901, 919, 920, 160, 170, 88, 64; 285/123.2

(56) References Cited

U.S. PATENT DOCUMENTS

| | | | | |
|---|---|---|---|---|
| 3,624,184 A | * | 11/1971 | Cox et al. ................... | 260/878 |
| 3,687,920 A | * | 8/1972 | Johnson ................. | 260/88.2 R |
| 3,969,470 A | * | 7/1976 | Spiegelman ............ | 260/897 A |
| 4,338,424 A | * | 7/1982 | Morita et al. ................. | 526/65 |
| 4,442,271 A | * | 4/1984 | Rau et al. ..................... | 526/61 |
| 4,970,280 A | * | 11/1990 | Chiba et al. .................. | 526/65 |
| 5,023,388 A | * | 6/1991 | Luker ............................ | 585/9 |
| 5,098,967 A | * | 3/1992 | Asanuma et al. ............. | 526/60 |
| 5,326,835 A | * | 7/1994 | Ahvenainen et al. ......... | 526/64 |
| 5,719,241 A | * | 2/1998 | Razavi et al. ................ | 526/119 |
| 5,859,157 A | * | 1/1999 | Gupte et al. .................. | 526/88 |
| 6,262,202 B1 | * | 7/2001 | Walzer, Jr. et al. ......... | 526/133 |
| 6,469,110 B1 | * | 10/2002 | Harlin et al. .................. | 526/65 |

* cited by examiner

Primary Examiner—David W. Wu
Assistant Examiner—Rip A Lee
(74) Attorney, Agent, or Firm—Birch, Stewart, Kolasch & Birch, LLP

(57) ABSTRACT

A method for producing an olefin homopolymer or an olefin copolymer from an olefin or an olefin and at least one comonomer copolymerizable therewith by continuous slurry polymerization or continuous gaseous phase polymerization in the presence of a metallocene catalyst, the method comprising transferring the catalyst to a polymerizer and introducing the catalyst into the polymerizer while continuously feeding the olefin or the olefin and the comonomer into the polymerizer, to thereby effect a homopolymerization of the olefin or a copolymerization of the olefin and the comonomer, wherein, said catalyst is subjected to hydrogen gas-treatment in which said catalyst is contacted with hydrogen gas. The method of the present invention is advantageous in that continuous production of an olefin homopolymer or an olefin copolymer can be stably performed without the disadvantageous occurrence of indefinite forms of polymer, so that a polymer withdrawal pipe can be prevented from being clogged with such indefinite forms of polymer, thus enabling continuous production of an olefin homopolymer or an olefin copolymer on a commercial scale.

7 Claims, 3 Drawing Sheets

METHOD FOR PRODUCING AN OLEFIN HOMOPOLYMER OR AN OLEFIN COPOLYMER

BACKGROUND OF THE INVENTION

1. Field of the Invention

The present invention relates to a method for producing an olefin homopolymer or an olefin copolymer. More particularly, the present invention is concerned with a method for producing an olefin homopolymer or an olefin copolymer from an olefin or an olefin and at least one comonomer copolymerizable therewith by continuous slurry polymerization or continuous gaseous phase polymerization in the presence of a metallocene catalyst, wherein said catalyst is subjected to hydrogen gas-treatment in which said catalyst is contacted with hydrogen gas.

The method of the present invention is advantageous in that production of an olefin homopolymer or an olefin copolymer by continuous slurry polymerization or continuous gaseous phase polymerization in the presence of a metallocene catalyst can be stably performed without suffering the occurrence of indefinite forms of polymer. That is, by the method of the present invention, a pipe for withdrawing a produced polymer from a polymerizer can be prevented from being clogged with indefinite forms of polymer, so that an olefin homopolymer or an olefin copolymer can be stably and efficiently produced by a continuous operation of a commercial scale plant.

2. Prior Art

As conventional catalysts for use in producing an olefin homopolymer or an olefin copolymer (hereinafter, both of the homopolymer and copolymer are frequently, collectively referred to simply as "olefin polymer"), there have been known the following three types of catalysts: a titanium-containing catalyst comprising a titanium containing compound and an organoaluminum compound; a vanadium-containing catalyst comprising a vanadium-containing compound and an organoaluminum compound; and a chromium-containing catalyst.

In addition to these catalysts, as an olefin polymerization catalyst, there has recently been proposed the so-called "metallocene catalyst", which comprises a metallocene compound containing a transition metal. It has been known that a metallocene catalyst is advantageous not only in that it has a high polymerization activity but also in that when the homopolymerization or copolymerization of an olefin is performed in the presence of a metallocene catalyst, there can be produced an olefin homopolymer having a narrow molecular weight distribution or an olefin copolymer having not only a narrow molecular weight distribution but also a uniform copolymerization distribution (i.e., uniform distribution with respect to the proportions of different component monomer units constituting the copolymer). It has also been known that, when the above olefin polymer having such advantageous properties has a high molecular weight, the olefin polymer exhibits excellent mechanical properties, such as high stiffness, high impact resistance and high environmental-stress-cracking resistance (ESCR). A high molecular weight olefin polymer having such excellent mechanical properties is highly promising as a molding material for producing various articles, such as bottles, pipes and films. Therefore, it has been desired to produce a high molecular weight olefin polymer by a process using a metallocene catalyst.

As representative examples of processes for polymerizing an olefin in the presence of a metallocene catalyst comprising a transition metal compound, there can be mentioned a solution polymerization process in which the polymerization is performed using a reaction solvent for a desired olefin polymer and hence the desired olefin polymer is produced in a dissolved form in the solvent, and the so-called "particulate-form type polymerization process", specifically a process in which an olefin polymer is produced in a particulate form. Examples of such particulate-form type polymerization processes include a slurry polymerization process and a gaseous phase polymerization process.

The solution polymerization process has a problem in that the viscosity of the solution of the polymer being produced is considerably increased in accordance with the increase in the molecular weight of the polymer, so that it is difficult to produce a polymer having a high molecular weight. Therefore, when it is desired to produce a high molecular weight olefin polymer by performing an olefin polymerization in the presence of a metallocene catalyst, it is necessary to employ a particulate-form type polymerization process.

On the other hand, metallocene catalysts tend to pose the following problem. A metallocene catalyst generally exhibits an especially high polymerization activity at the initial stage of the polymerization. Therefore, when a metallocene catalyst is used in a particulate-form type polymerization process, a vigorous polymerization reaction occurs in the initial stage of the polymerization, and, hence, the heat of polymerization is vigorously generated. The rate of heat generation becomes higher than the rate at which heat is removed from the reaction system. Therefore, local high temperature portions (heat spots) are formed in the particulate polymer being produced, and the temperature of such heat spots increases to a temperature which is the same as or higher than the melting temperature of the polymer. The resultant molten polymer particles fuse with each other, thereby producing indefinite forms of polymer. When such indefinite forms of polymer are formed in a continuous polymerization process, the pipe or other means for withdrawing the produced polymer from the polymerizer is clogged with the indefinite forms of polymer, so that it becomes impossible to withdraw the produced polymer from the polymerizer through the pipe, thus making it impossible to continuously perform the polymerization. When a process for producing an olefin polymer cannot be continuously performed, the efficiency of the process is low and, hence, it is difficult to practice the process on a commercial scale.

Meanwhile, it has been attempted to synthesize an excellent catalyst which is effective for solving the above-mentioned problem, and various methods have been proposed for synthesizing such excellent metallocene catalysts. However, the proposed methods for synthesizing metallocene catalysts have a problem in that the reproducibility of the polymerization behavior of the catalyst synthesized is poor. That is, even if a metallocene catalyst is synthesized by the same method, not only the polymerization activity of the catalyst obtained but also the ability of the obtained catalyst to suppress the above-mentioned problem (i.e., the occurrence of indefinite forms of polymer) changes every time the catalyst is synthesized. Therefore, it has been strongly desired to develop a particulate-form type polymerization process for producing an olefin polymer, which is advantageous in that, even when such a conventional metallocene catalyst is employed, the problem of the occurrence of indefinite forms of polymer can be reliably and surely solved, thus enabling continuous production of an olefin polymer on a commercial scale.

SUMMARY OF THE INVENTION

In this situation, the present inventor has made extensive and intensive studies with a view toward developing an improved method for producing an olefin homopolymer or an olefin copolymer, which enables stable continuous production of an olefin polymer in the presence of a metallocene catalyst. As a result, it has unexpectedly been found that, in a method for producing an olefin homopolymer or an olefin copolymer from an olefin or an olefin and at least one comonomer copolymerizable therewith by continuous slurry polymerization or continuous gaseous phase polymerization in the presence of a metallocene catalyst, for attaining the above objective, it is very effective that, wherein, said catalyst is subjected to hydrogen gas-treatment in which said catalyst is contacted with hydrogen gas. The present invention has been completed, based on the above novel finding.

It is, therefore, a primary object of the present invention to provide an improved method for producing an olefin homopolymer or an olefin copolymer, which is advantageous in that continuous production of an olefin homopolymer or an olefin copolymer by slurry polymerization or gaseous phase polymerization in the presence of a metallocene catalyst can be stably performed without the disadvantageous occurrence of indefinite forms of polymer. As a result, the polymer withdrawal pipe can be prevented from being clogged with such indefinite forms of polymer, thus enabling continuous production of an olefin homopolymer or an olefin copolymer on a commercial scale.

The foregoing and other objects, features and advantages of the present invention will be apparent to those skilled in the art from the following detailed description taken in connection with the appended claims.

DETAILED DESCRIPTION OF THE INVENTION

According to the present invention, there is provided a method for producing an olefin homopolymer or an olefin copolymer from an olefin or an olefin and at least one comonomer copolymerizable therewith by continuous slurry polymerization or continuous gaseous phase polymerization in the presence of a metallocene catalyst, wherein said catalyst is subjected to hydrogen gas-treatment in which said catalyst is contacted with hydrogen gas.

For an easy understanding of the present invention, the essential features and various preferred embodiments of the present invention are enumerated below.
1. A method for producing an olefin homopolymer or an olefin copolymer from an olefin or an olefin and at least one comonomer copolymerizable therewith by continuous slurry polymerization or continuous gaseous phase polymerization in the presence of a metallocene catalyst, wherein said catalyst is subjected to hydrogen gas-treatment in which said catalyst is contacted with hydrogen gas.
2. The method according to item 1, wherein said method comprises:
    (1) providing a polymerizer; and
    (2) transferring said catalyst to said polymerizer and introducing said catalyst into said polymerizer while continuously feeding said olefin or continuously feeding said olefin and said comonomer into said polymerizer, to thereby effect a homopolymerization of said olefin or a copolymerization of said olefin and said comonomer, said catalyst comprising:
    (A) a transition metal compound comprising a transition metal having η-bonded thereto a cyclic anionic ligand,
    (B) an activator compound (B-1) comprising a cation and a noncoordinating, compatible anion and being capable of reacting with the transition metal compound (A) to form a metal complex having a catalytic activity, and optionally an organometallic compound (B-2), optionally
    (C) a solid component, and optionally
    (D) an organoaluminum compound,
    wherein, prior to or simultaneously with homopolymerization of said olefin in the polymerizer by said catalyst or copolymerization of said olefin and said comonomer in the polymerizer by said catalyst, said catalyst is subjected to hydrogen gas-treatment in which said catalyst is contacted with hydrogen gas.
3. The method according to items 1 or 2, wherein prior to the introduction of said catalyst into the polymerizer, said catalyst is subjected to hydrogen gas-treatment in which said catalyst is contacted with hydrogen gas.
4. The method according to items 1 or 2, wherein together with the introduction of said catalyst into the polymerizer, said catalyst is subjected to hydrogen gas-treatment in which said catalyst is contacted with hydrogen gas.
5. The method according to items 1 or 2, wherein, in said hydrogen gas-treatment of the catalyst, said hydrogen gas is used in an amount of 0.05 to 50,000 times the molar amount of said transition metal compound (A), wherein said amount of the hydrogen gas is defined in terms of the molar amount of the hydrogen molecules contained in said hydrogen gas.
6. The method according to item 3, wherein said polymerizer has a catalyst transfer pipe connected thereto and, in step (2), said catalyst is transferred together with a catalyst transfer medium which is flowed in said catalyst transfer pipe, and wherein said hydrogen gas-treatment of the catalyst is performed by introducing hydrogen gas into the catalyst transfer medium to thereby contact the catalyst with the hydrogen gas during the transfer of the catalyst through the catalyst transfer pipe.
7. The method according to item 6, wherein said catalyst transfer pipe includes a conduit connected to a sidewall thereof for feeding hydrogen gas into the catalyst transfer pipe, and wherein said introduction of hydrogen gas into the catalyst transfer medium is performed by feeding hydrogen gas into the catalyst transfer pipe through said conduit.
8. The method according to item 7, wherein said conduit for feeding hydrogen gas into the catalyst transfer pipe is connected to the catalyst transfer pipe in said polymerizer.
9. The method according to item 4, wherein said polymerizer has a catalyst transfer pipe connected hereto, and wherein, while introducing said catalyst into the polymerizer, said catalyst is subjected to hydrogen gas-treatment in which said catalyst is contacted with hydrogen gas by introducing the hydrogen gas in close proximity to the catalyst.
10. The method according to item 9, wherein the catalyst and hydrogen are introduced into the polymerizer in a double wall pipe which has an inner pipe having a nozzle and an outer pipe having a nozzle, and wherein said introduction of hydrogen gas is performed by feeding the catalyst to the inner pipe and feeding hydrogen gas to the outer pipe.

11. The method according to item 9, wherein said polymerizer has a nozzle for introducing said hydrogen gas into said polymerizer in close proximity to an end of the catalyst transfer pipe, and wherein said introduction of hydrogen gas is performed by introducing hydrogen gas through said nozzle.

12. The method according to any one of items 1–4, wherein said hydrogen gas used for said hydrogen gas-treatment of the catalyst has a purity of 99.99% by mole or more.

13. The method according to any one of items 1–4, wherein said olefin is selected from the group consisting of ethylene and C3–C20 α-olefins.

Moreover, with respect to items 1 to 13, instead of said hydrogen gas, nitrogen or a Lewis acid may be used.

Herein below, the present invention will be described in more detail.

In the present invention, the term "polymerization" means either homopolymerization or copolymerization.

With respect to the reason why the occurrence of indefinite forms of polymer can be prevented by the method of the present invention in which, prior to the introduction of the catalyst into a polymerizer, the catalyst is subjected to a hydrogen gas-treatment in which the catalyst is contacted with hydrogen gas, complete elucidation has not yet been made. However, the reasons can be presumed as follows.

(1) By the hydrogen gas-treatment of the metallocene catalyst prior to homopolymerization of said olefin or copolymerization of said olefin and said comonomer by said catalyst, the polymerization activity of the catalyst at the initial stage of the polymerization is appropriately lowered, so that the vigorous generation of the heat of polymerization at the initial stage of polymerization can be suppressed.

(2) Due to the presence of the hydrogen gas used in the hydrogen gas-treatment of the metallocene catalyst, there occurs a temporary decrease in the partial pressure of the olefin around the catalyst introduced into the polymerizer, so that the polymerization rate at the initial stage of the polymerization is appropriately lowered, thereby suppressing a vigorous generation of the heat of polymerization.

In the method of the present invention, as a mode of polymerization reaction for homopolymerizing an olefin or copolymerizing an olefin and at least one comonomer copolymerizable therewith, a continuous slurry polymerization or a continuous gaseous phase polymerization is employed. Of these modes of polymerization, a continuous slurry polymerization is preferred.

Generally, in a continuous slurry polymerization, a catalyst, at least one monomer and a molecular weight regulator (such as hydrogen gas or zinc dienyl), are added to the polymerization reaction medium to thereby perform a polymerization reaction. During the polymerization reaction, the reaction system is in the form of a suspension of a solid particulate polymer. In an olefin polymerization performed by a continuous slurry polymerization, into a polymerizer is continuously introduced an olefin or a mixture of an olefin and at least one comonomer copolymerizable therewith and, continuously or intermittently, are introduced a catalyst, a molecular weight regulator (such as hydrogen gas or zinc dienyl) and a polymerization reaction medium, while continuously or intermittently withdrawing the suspension of a solid particulate polymer from the polymerizer. The withdrawn suspension of the solid particulate polymer is transferred to equipment where the suspension is subjected to subsequent steps, such as a separation step and a drying step.

When the method of the present invention is performed by continuous slurry polymerization, use is made of a polymerization reaction medium which is in the form of a liquid under polymerization reaction conditions and which is inert to the polymerization reaction and does not lower the polymerization activity of the catalyst.

As an example of the polymerization reaction medium used in the continuous slurry polymerization, there can be mentioned an inert hydrocarbon reaction medium. Further, an olefin itself can also be used as a polymerization reaction medium.

Examples of such inert hydrocarbon reaction media include aliphatic hydrocarbons, such as propane, n-butane, isobutane, pentane, hexane, heptane, octane, decane, dodecane and kerosene; alicyclic hydrocarbons, such as cyclopentane, cyclohexane and methylcyclopentane, aromatic hydrocarbons, such as benzene, toluene and xylene; halogenated hydrocarbons, such as ethyl chloride, chlorobenzene and dichloromethane; and mixtures thereof.

Among these inert hydrocarbon reaction media, hexane, pentane and isobutane are preferred.

On the other hand, when the method of the present invention is performed by continuous gaseous phase polymerization, a gas containing an olefin or a mixture of an olefin and at least one comonomer copolymerizable therewith is continuously flowed through a fluidized bed comprised of a catalyst under polymerization reaction conditions. The produced olefin polymer is continuously replaced by a fresh olefin or a fresh olefin/comonomer mixture by continuously flowing a gas containing the fresh olefin or fresh olefin/comonomer mixture through the fluidized bed while continuously or intermittently withdrawing the gas containing the produced olefin polymer from the fluidized bed in the polymerizr Further, with respect to the catalyst used in the continuous gaseous phase polymerization, the spent catalyst is continuously or intermittently withdrawn from the polymerizer while continuously or intermittently introducing a fresh catalyst into the polymerizer.

In the method of the present invention, it is preferred that the polymerizer has a catalyst transfer pipe connected thereto and, in step (2), the catalyst is transferred together with a catalyst transfer medium which is flowed in the catalyst transfer pipe.

As an example of a catalyst transfer medium, there can be mentioned an inert hydrocarbon medium.

Examples of such inert hydrocarbon media include aliphatic hydrocarbons, such as propane, n-butane, isobutane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethyl chloride, chlorobenzene and dichloromethane; and mixtures thereof. An olefin monomer, which is used as a monomeric raw material for producing an olefin homopolymer or an olefin copolymer in the method of the present invention, can also be used as a catalyst transfer medium.

When the method of the present invention is performed by continuous slurry polymerization, the catalyst transfer medium and the polymerization reaction medium may be the same or different. For example, there may be used a combination of hexane as a polymerization reaction medium and toluene as a catalyst transfer medium.

In the method of the present invention, an olefin homopolymer is produced from an olefin, or an olefin copolymer is produced from an olefin and at least one comonomer copolymerizable therewith.

Examples of olefins used in the method of the present invention include ethylene and C3–C20 α-olefins. Specific examples of C3–C20 α-olefins include propylene, 1-butene, 1-hexene, 4-methyl-1-pentene, 1-octene and 1-decene. The comonomer used in the present invention may also be an olefin. That is, at least two different olefins selected from the above-mentioned examples of olefins may be copolymerized with each other.

If desired, the comonomer used in the present invention may be a compound other than olefins. Examples of such comonomers other than olefins include aromatic vinyl compounds, such as styrene, α-methylstyrene and p-methylstyrene; polar vinyl compounds, such as vinyl chloride and acrylonitrile; dienes, such as butadiene and isopurene; alicyclic olefins, such as cyclohexene and norbornene; alicyclic diolefins, such as cyclohexadiene and norbornadiene; alkynes, such as polymerizable acetylene; and aldehydes, such as 2-propenal.

In the method of the present invention, it is preferred that ethylene is homopolymerized or copolymerized with at least one comonomer selected from C3–C20 α-olefins. It is more preferred that ethylene is homopolymerized or copolymerized with at least one comonomer selected from C3–C8 α-olefins.

In the method of the present invention, it is preferred that the reaction pressure of the continuous slurry polymerization or continuous gaseous phase polymerization is in the range of from atmospheric pressure to 50 atm. It is preferred that the reaction temperature of the continuous slurry polymerization or continuous gaseous phase polymerization is in the range of from 40° C. to 120° C., more advantageously from 60° C. to 120° C.

When the method of the present invention is performed by continuous slurry polymerization, it is preferred that the weight percentage of the formed polymer (i.e., slurry concentration) in the slurry as the reaction system is 60% by weight or less, more advantageously 40% by weight or less.

In the method of the present invention, it is requisite that said catalyst is subjected to hydrogen gas-treatment in which said catalyst is contacted with hydrogen gas. It is preferred that prior to or simultaneously with homopolymerization of said olefin in the polymerizer by said catalyst or copolymerization of said olefin and said comonomer in the polymerizer by said catalyst, said catalyst is subjected to hydrogen gas-treatment in which said catalyst is contacted with hydrogen gas. It is more preferred that prior to contact of the catalyst with the olefin or said comonomer, said catalyst is subjected to hydrogen gas-treatment in which said catalyst is contacted with hydrogen gas.

Examples of said hydrogen gas-treatment include: (i) prior to the introduction of said catalyst into the polymerizer, said catalyst is subjected to hydrogen gas-treatment in which said catalyst is contacted with hydrogen gas, and (ii) together with the introduction of said catalyst into the polymerizer, said catalyst is subjected to hydrogen gas-treatment in which said catalyst is contacted with hydrogen gas.

Examples of methods (i) above for performing the hydrogen gas-treatment defined in the present invention include: (I) a method in which, in step (2) of the method of the present invention, the catalyst is transferred together with a catalyst transfer medium, and the hydrogen gas-treatment of the catalyst is performed by introducing hydrogen gas into the catalyst transfer medium to thereby contact the catalyst with the hydrogen gas during the transfer of the catalyst; and (II) a method in which, prior to step (2) of the method of the present invention (i.e., prior to the start of the transfer of the catalyst toward the polymerizer), the catalyst is placed in, for example, a catalyst reservoir, and hydrogen gas is introduced into the catalyst reservoir containing the catalyst to thereby contact the catalyst with the hydrogen gas.

The hydrogen gas-treatment method of item (i) above can be efficiently performed by one mode of the method of the present invention, in which the polymerizer(1) has a catalyst transfer pipe(2) connected thereto and, in step (2), the catalyst is transferred together with a catalyst transfer medium which is flowed in the catalyst transfer pipe(2) and the hydrogen gas-treatment of the catalyst is performed by introducing hydrogen gas into the catalyst transfer medium to thereby contact the catalyst with the hydrogen gas during the transfer of the catalyst through the catalyst transfer pipe(2).

Figure 1:
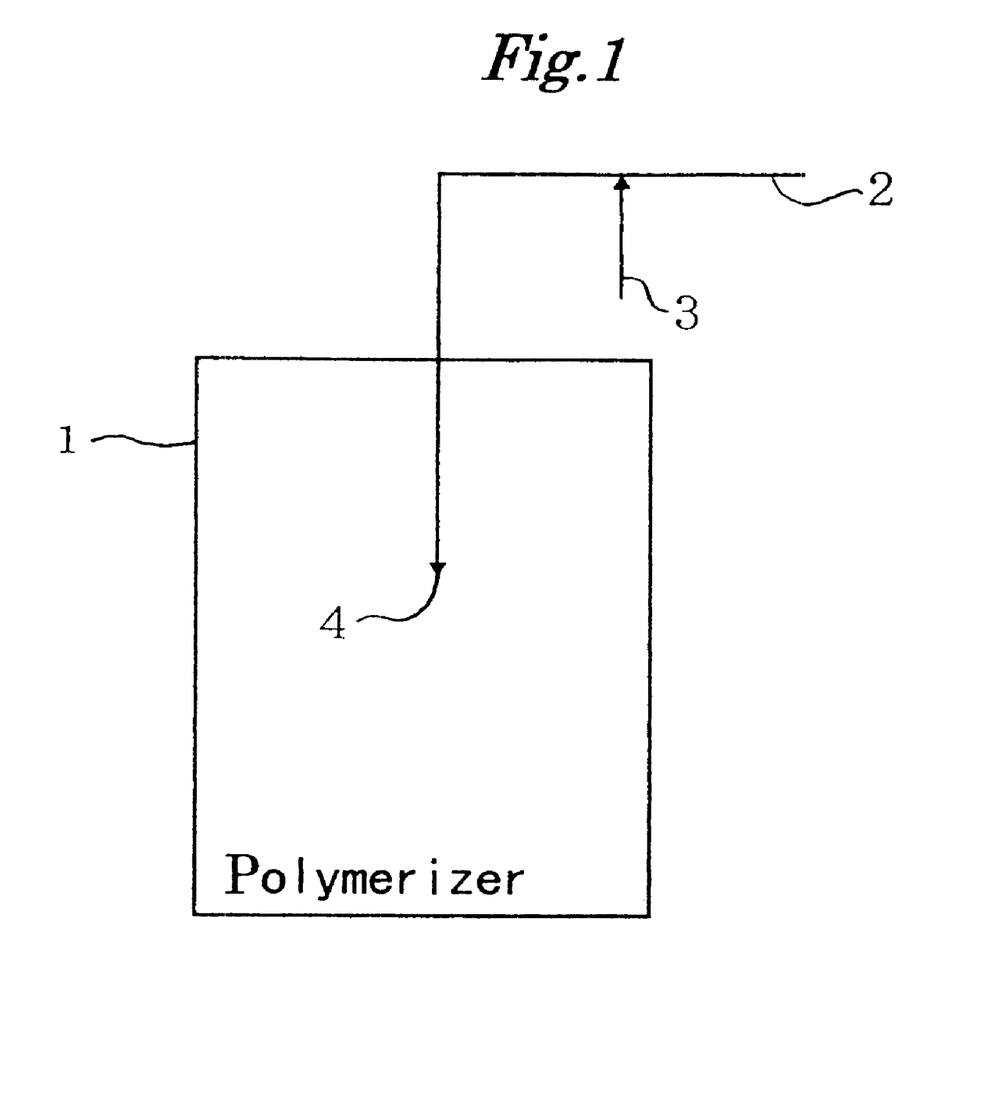
FIG. 1. is one embodiment of a polymerizer employed in the method of the present invention.

With respect to the above-mentioned mode of the method of the present invention in which the hydrogen gas-treatment is performed during the transfer of the catalyst through the catalyst transfer pipe, it is preferred that the catalyst transfer pipe has, fluidtightly connected to a side wall thereof, a branched-conduit(3) for feeding hydrogen gas into the catalyst transfer pipe(2), and the introduction of hydrogen gas into the catalyst transfer medium is performed by feeding hydrogen gas into the catalyst transfer pipe(2) through the conduit(3) as illustrated in FIG. 1. The conduit(3) may be connected to the catalyst transfer pipe either inside the polymerizer or outside the polymerizer.

As a further example of methods for performing the hydrogen gas-treatment defined in the present invention, there can be mentioned a method in which, prior to step (2), the hydrogen gas-treatment of the catalyst is performed by mixing the catalyst with a catalyst transfer medium containing hydrogen gas introduced thereinto, to thereby contact the catalyst with the hydrogen gas, and, in step (2), the catalyst is transferred together with the catalyst transfer medium.

Figure 2:
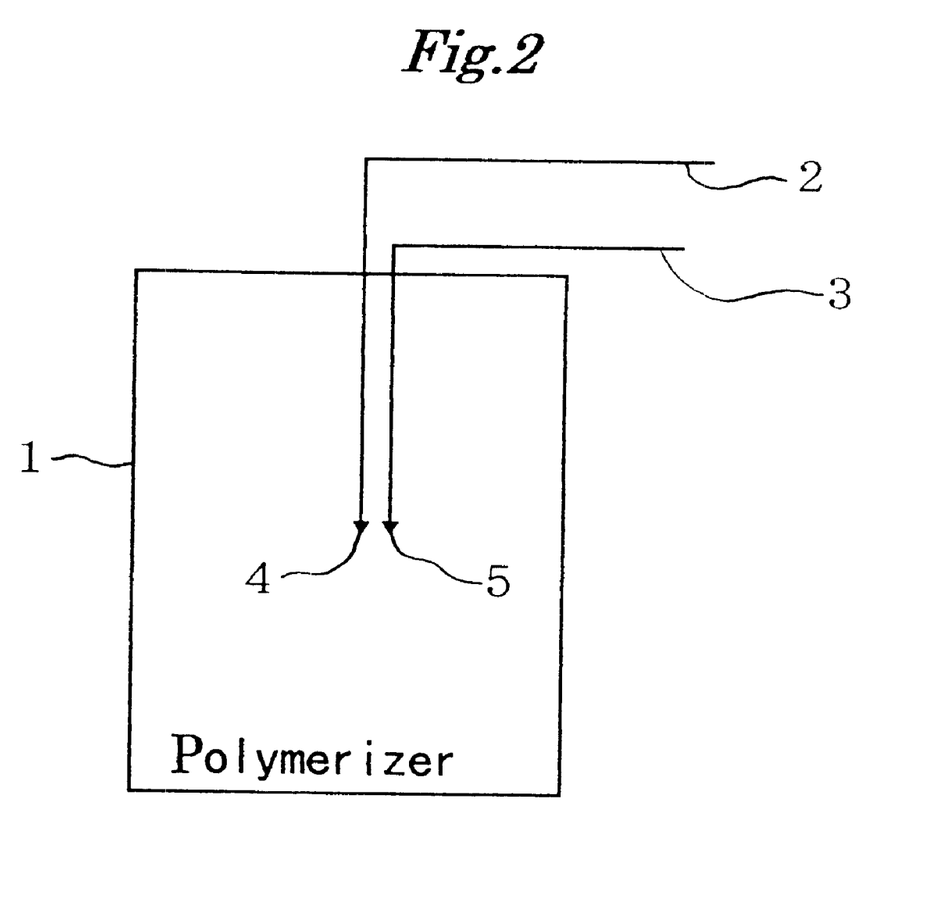
FIG. 2. is another embodiment of a polymerizer employed in the method of the present invention.
Figure 3:
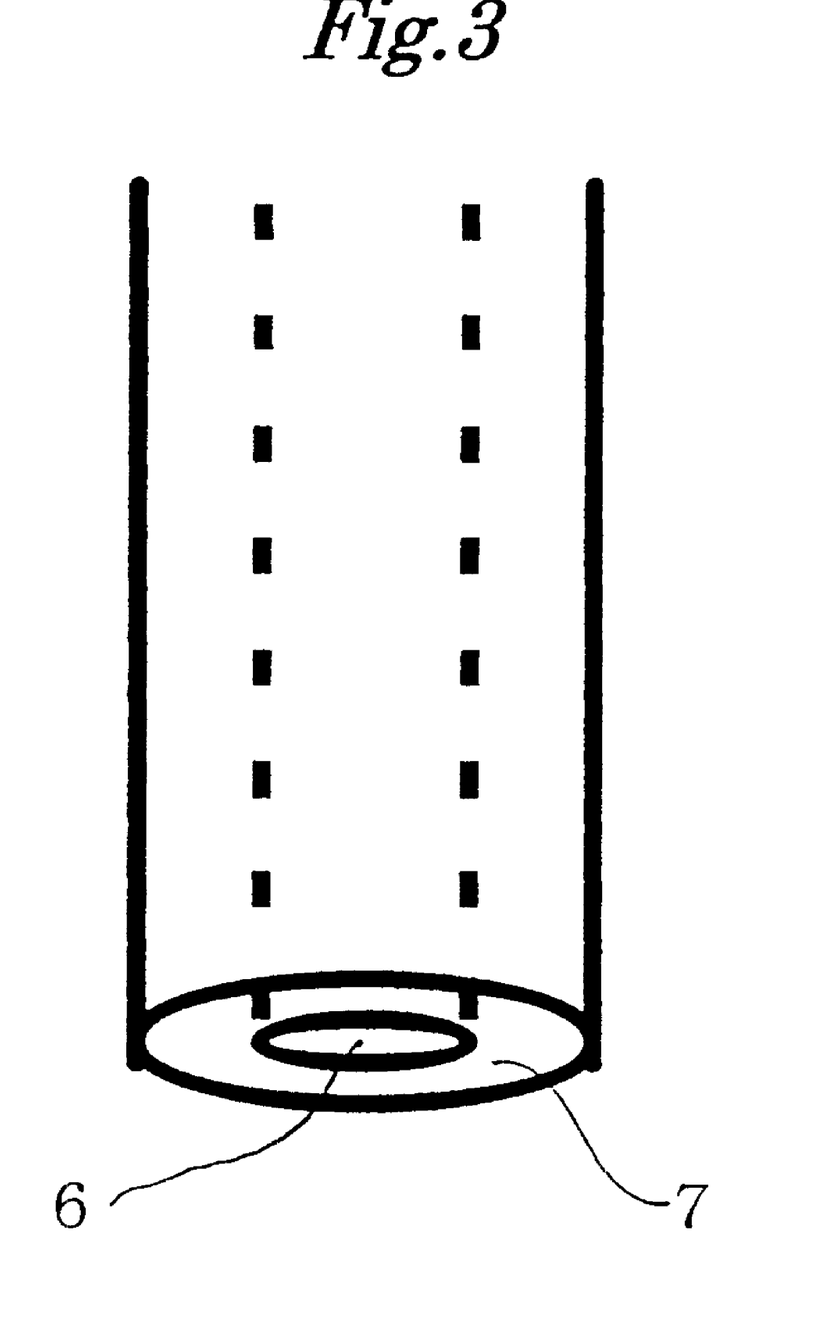
FIG. 3. illustrates one form of double wall pipes employed in the method of the present invention.

Examples of methods (ii) above for performing the hydrogen gas-treatment defined in the present invention included: a method in which, the catalyst and hydrogen are introduced into the polymerizer in a double wall pipe which has an inner pipe having a nozzle (6) and an outer pipe having a nozzle (7) as illustrated in FIG. 3, and wherein said introduction of hydrogen gas is performed by feeding the catalyst to the inner pipe and feeding hydrogen-gas to the outer pipe or in which, said polymerizer (1) has a nozzle (5) for introducing said hydrogen gas into said polymerizer (1) in close proximity to an opening for introducing the catalyst, such as an end of the catalyst transfer pipe (2) at a catalyst supply port (4), and wherein said introduction of hydrogen gas is performed by introducing hydrogen gas through said nozzle (5) as illustrated in FIG. 2.

In the method of the present invention, wherein, the hydrogen gas is introduced in close proximity to an end of the catalyst transfer pipe(4) through the nozzle(5), it is preferred that the tip of the nozzle for supplying the hydrogen gas is about ⅕ of the internal diameter of the polymerizer or less, more preferably ¹⁄₁₀ of the internal diameter of the polymerizer or less, most preferably ¹⁄₂₀ of the internal diameter of the polymerizer or less from the opening for introducing the catalyst, such as the end of the catalyst transfer pipe.

With respect to the hydrogen gas-treatment of the catalyst in the present invention, it is preferred that the amount of the hydrogen gas used is 0.5 to 50,000 times the molar amount of the transition metal compound (A) contained in the metallocene catalyst, wherein the amount of the hydrogen gas is defined in terms of the molar amount of the hydrogen molecules contained in the hydrogen gas. When the amount of the hydrogen gas used in the hydrogen gas-treatment of the catalyst is less than 0.5 time the molar amount of the transition metal compound (A), the effect of suppressing the occurrence of indefinite forms of polymer cannot achieved. On the other hand, when the amount of the hydrogen gas used in the hydrogen gas-treatment of the catalyst is more than 50,000 times the molar amount of the transition metal compound (A), the polymerization activity of the metallocene catalyst is disadvantageously decreased. In the method of the present invention, it is more preferred that the amount of the hydrogen gas used in the hydrogen gas-treatment of the catalyst is 10 to 30,000 times, more advantageously 100 to 10,000 times the molar amount of the transition metal compound (A), wherein the amount of the hydrogen gas is defined in terms of the molar amount of the hydrogen molecules contained in the hydrogen gas.

In the method of the present invention, when said catalyst is introduced together with the catalyst transfer medium into the polymerizer, the peak concentration of the catalyst in the catalyst transfer medium is preferably 0.05–5 g/liter, more preferably 0.05–3 g/liter, most preferably 0.05–0.5 g/liter. The term "peak concentration" means the greatest value among the amount of the catalyst introduced into the polymerizer divided by the amount of the catalyst transfer medium introduced into the polymerizer. The expression, "the amount of the catalyst", means the total weight of (A) a transition metal compound comprising a transition metal having η-bonded thereto a cyclic anionic ligand, (B) a mixture of (B-1) an activator compound comprising a cation and a noncoordinating, compatible anion and being capable of reacting with the transition metal compound (A) to form a metal complex having a catalytic activity, and (B-2) an organometallic compound, (C) a solid component, and (D) an organoaluminum compound.

When said catalyst is introduced into the polymerizer, the linear speed of feeding the catalyst into the polymerizer is preferably 0.01 m/s–5 m/s, more preferably 0.01 m/s–3 m/s, and still more preferably 0:01 m/s–1 m/s, with the proviso that "a linear speed" means the amount of the catalyst transfer medium divided by the cross section of the opening for introducing the catalyst, such as an end of the catalyst transfer pipe, into the polymerizer.

When hydrogen gas is used as a molecular weight regulator, the hydrogen gas used in the hydrogen gas-treatment of the metallocene catalyst may be employed as a portion or all of the hydrogen gas used as a molecular weight regulator. Specifically, for example, a portion or all of the hydrogen gas used as a molecular weight regulator may be used for the hydrogen gas-treatment of the catalyst by introducing the hydrogen gas into a catalyst transfer medium which is transferred to the polymerizer together with the catalyst (wherein, after the hydrogen gas has been transferred to and introduced into the polymerizer together with the catalyst and the catalyst transfer medium, the hydrogen gas serves as a molecular weight regulator in the polymerizer). In this case, when the hydrogen gas used in the hydrogen gas-treatment of the catalyst is a portion of the hydrogen gas used as a molecular weight regulator, the remaining portion of the hydrogen gas as a molecular weight regulator is directly fed into the polymerizer through, for example, a hydrogen gas introduction pipe fluid-tightly connected to the polymerizer.

In the method of the present invention, with respect to the contact time between the metallocene catalyst and the hydrogen gas in the hydrogen gas-treatment of the catalyst, there is no particular limitation however, it is preferred that the contact time is 10 minutes or less, more advantageously 5 minutes or less, still more advantageously 1 minute or less, still more advantageously 30 seconds or less, most advantageously 20 seconds or less. On the other hand, it is preferred that the contact time is 0.01 second or more, more advantageously 0.1 second or more.

It is preferred that the purity of the hydrogen gas used for the hydrogen gas-treatment of the catalyst is 99.99% by mole or more, more advantageously 99.999% by mole or more, still more advantageously 99.9999% by mole or more. Such high purity hydrogen gas can be easily obtained by contacting hydrogen gas with an adsorbent, such as molecular sieves, activated alumina or copper oxides, to remove impurities (such as water, oxygen, sulfur, carbon monoxide, carbon dioxide and nitrogen oxides) from the hydrogen gas. The purity of hydrogen gas can be measured by gas chromatography (using, for example, a gas chromatography apparatus Model GC 8A, manufactured and sold by Shimadzu Corporation, Japan).

In the method of the present invention, as the olefin polymerization catalyst, a metallocene catalyst is used.

The reference character(s) and suffix(es), which are used in various formulae described herein, are, respectively, used to designate, specific element(s), specific substituent(s) or the like and specific number(s) or the like, only in connection with a certain formula in which the reference character (s) and suffix(es) are used, and, therefore, the same reference character(s) and suffix(es) used in different formulae do not always designate the same element(s), substituent(s) or the like and the same number(s) or the like, respectively.

The Periodic Table referred to herein is the Periodic Table published and copyrighted by CRC Press, Inc., 1989. The "Group" and "Groups" used herein are in accordance with the above-mentioned Periodic Table and the IUPAC system for numbering groups.

The term "hydrocarbyl group" as employed herein means any aliphatic, cycloaliphatic, aromatic group or any combination thereof.

The term "hydrocarbyloxy" group employed herein means a hydrocarbyl group having oxygen, which is bonded, through an oxygen linkage, to a metal atom, a metalloid, or a carbon, nitrogen or phosphorus atom of a compound.

The term "silyl group" employed herein means a silicon-containing group bonded, through a silicon linkage, to a metal atom, a metalloid, or a carbon, nitrogen or phosphorus atom of a compound.

The term "germyl group" employed herein means a germanium-containing group bonded, through a germanium linkage, to a metal atom, a metalloid, or a carbon, nitrogen or phosphorus atom of a compound.

The olefin polymerization catalyst used in the method of the present invention is a metallocene catalyst. Examples of the said catalyst include:

(A) a transition metal compound comprising a transition metal having η-bonded thereto a cyclic anionic ligand;

(B) an activator compound (B-1) comprising a cation and a noncoordinating, compatible anion and being capable of reacting with the transition metal compound (A) to form a metal complex having a catalytic activity, and optionally an organometallic compound (B-2); optionally (C) a solid component; and optionally (D) an organoaluminum compound.

When continuous slurry polymerization is employed, use of optional component (C) is preferred.

Hereinbelow, explanation is made with respect to a transition metal compound (A) comprising a transition metal having η-bonded thereto a cyclic anionic ligand (hereinafter, frequently referred to simply as "component (A)").

As an example of component (A) used in the present invention, there can be mentioned a compound represented by the following formula (2):

$$L_j W_k MX_p X'_q \quad (2)$$

wherein:

L (each occurrence) independently represents a η-bonded, cyclic anionic ligand selected from the group consisting of a cyclopentadienyl group, an indenyl group, a tetrahydroindenyl group, a fluorenyl group, a tetrahydrofluorenyl group and an octahydrofluorenyl group, wherein the bonded, cyclic anionic ligand optionally has 1 to 8 substituents, each of which independently has up to 20 non-hydrogen atoms and is independently selected from the group consisting of a $C_1$–$C_{20}$ hydrocarbon group, a halogen, a $C_1$–$C_{12}$ halogen-substituted hydrocarbon group, a $C_1$–$C_{12}$ aminohydrocarbyl group, a $C_1$–$C_{12}$ hydrocarbyloxy group, a $C_1$–$C_{12}$ dihydrocarbylamino group, a $C_1$–$C_{12}$ hydrocarbylphosphino group, a silyl group, an aminosilyl group, a $C_1$–$C_{12}$ hydrocarbyloxysilyl group and a halosilyl group;

M represents a transition metal selected from transition metals of Group 4 of the Periodic Table, each independently having a formal oxidation state of +2, +3 or +4, the transition metal being bonded, in a $\eta^5$-bonding mode, to at least one L;

W represents a divalent substituent having up to 50 non-hydrogen atoms, which has one valence bonded to L and one valence bonded to M, so that W, L and M together form a metallocycle;

X (each occurrence) independently represents a ligand having up to 60 non-hydrogen atoms, which is a monovalent σ-bonded anionic ligand having both valences bonded to M, or a divalent σ-bonded anionic ligand having one valence bonded to M and one valence bonded to L;

X' (each occurrence) independently represents a neutral Lewis base ligating.compound having up to 40 non-hydrocarbon atoms;

j is 1 or 2, with the proviso that, when j is 2, two L ligands are optionally bonded together through a divalent group having up to 20 non-hydrogen atoms, which is selected from the group consisting of a $C_1$–$C_{20}$ hydrocarbadiyl group, a $C_1$–$C_{12}$ halohydrocarbadiyl group, a $C_1$–$C_{12}$ hydrocarbyleneoxy group, a $C_1$–$C_{12}$ hydrocarbyleneamino group, a siladiyl group, a halosiladiyl group and an aminosilane;

k is 0 or 1;

p is 0, 1 or 2, with the proviso that when X is a monovalent σ-bonded anionic ligand or a divalent σ-bonded anionic ligand having one valence bonded to M and one valence bonded to L, p is an integer which is one or more smaller than the formal oxidation state of M, and that, when X is a divalent σ-bonded anionic ligand having both valences bonded to M, p is an integer which is (j+1) or more smaller than the formal oxidation state of M; and q is 0, 1 or 2.

Examples of X ligands used in the compound of formula (2) above include a halogen, a $C_1$–$C_{60}$ hydrocarbon group, a $C_1$–$C_{60}$ hydrocarbyloxy group, a $C_1$–$C_{60}$ hydrocarbylamido group, a $C_1$–$C_{60}$ hydrocarbylphosphido group, a $C_1$–$C_{60}$ hydrocarbylsulfido group, a silyl group and combinations thereof.

Examples of X' neutral Lewis base ligating compounds used in the compound of formula (2) above include phosphines, ethers, amines, $C_2$–$C_{40}$ olefins, $C_1$–$C_{40}$ dienes and divalent groups derived from these compounds.

In the present invention, it is preferred that component (A) is a transition metal compound represented by formula (2) above wherein j is 1.

Preferred examples of compounds of formula (2) above wherein j is 1 include a compound represented by the following formula (3):

(3)

wherein:

M represents a transition metal selected from the group consisting of titanium, zirconium and hafnium, each independently having a formal oxidation state of +2, +3 or +4;

$R^3$ (each occurrence) independently represents a substituent having up to 20 non-hydrogen atoms, which is selected from the group consisting of hydrogen, a $C_1$–$C_8$ hydrocarbon group, a silyl group, a germyl group, a cyano group, a halogen and combinations thereof, with the proviso that, when substituent $R^3$ is a $C_1$–$C_8$ hydrocarbon group, a silyl group or a germyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;

X" (each occurrence) independently represents a substituent having up to 20 non-hydrogen atoms, which is selected from the group consisting of a halogen, a $C_1$–$C_{20}$ hydrocarbon group, a $C_1$–$C_{18}$ hydrocarbyloxy group, a $C_1$–$C_{18}$ hydrocarbylamino group, a silyl group, a $C_1$–$C_{18}$ hydrocarbylamido group, a $C_1$–$C_{18}$ hydrocarbylphosphido group, a $C_1$–$C_{18}$ hydrocarbylsulfido group and combinations thereof, with the proviso that two X" substituents optionally together form a neutral $C_4$–$C_{30}$ conjugated diene or optionally together form a divalent group;

Y represents —O—, —S—, —NR*— or —PR*— wherein R* represents hydrogen, a $C_1$–$C_{12}$ hydrocarbon group, a $C_1$–$C_8$ hydrocarbyloxy group, a silyl group, a $C_1$–$C_8$ hologenated alkyl group and a $C_6$–$C_{20}$ hologenated aryl group or a combination thereof;

Z represents $SiR^*_2$, $CR^*_2$, $SiR^*_2SiR^*_2$, $CR^*_2CR^*_2$, $CR^*{=}CR^*$, $CR^*_2SiR^*_2$ or $GeR^*_2$ wherein R* is as defined above; and n is 1, 2 or 3.

More preferred examples of compounds of formula (2) above wherein j is 1 include a compound represented by the following formula (4) or (5)

(4)

(5)

wherein:
M represents a transition metal selected from the group consisting of titanium, zirconium and hafnium, each independently having a formal, oxidation state of +2, +3 or +4;

$R^3$ (each occurrence) independently represents a substituent having up to 20 non-hydrogen atoms, which is selected from the group consisting of hydrogen, $C_1$–$C_8$ hydrocarbon group, a silyl group, a germyl group, a cyano group, a halogen and combinations thereof, with the proviso that, when the $R^3$ substituent is a $C_1$–$C_8$ hydrocarbon group, a silyl group or a germyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;

X (each occurrence) independently represents a substituent having up to 20 non-hydrogen atoms, which is selected from the group consisting of a halogen, a $C_1$–$C_{20}$ hydrocarbon group, a $C_1$–$C_{12}$ hydrocarbyloxy group, a $C_2$–$C_{12}$ di(hydrocarbyl)amido group, a $C_2$–$C_{12}$ di(hydrocarbyl)phosphido group, a $C_1$–$C_{12}$ hydrocarbylsulfido group, a silyl group and combinations thereof, or represents a stabilizing anionic ligand selected from the group consisting of an allyl group, a 2-(N,N-dimethylaminomethyl)phenyl group and a 2-(N,N-dimethylamino)benzyl group, or represents a divalent group derived from a C4–C30 conjugated diene, with the proviso that X and M optionally together form a metallocyclopentene group;

X' (each occurrence) independently represents a neutral conjugated or non-conjugated diene having up to 40 carbon atoms, which is unsubstituted or substituted with at least one $C_1$–$C_{12}$ hydrocarbon group and which forms a π-complex in cooperation with M;

Y represents —O—, —S—, —NR*— or —PRR*— wherein R* represents a hydrogen, a $C_1$–$C_{12}$ hydrocarbon group, a $C_1$–$C_8$ hydrocarbyloxy group, a silyl group, a $C_1$–$C_8$ halogenated alkyl group and a $C_1$–$C_{20}$ halogenated aryl group or a combination thereof;

Z represents SiR*$_2$, CR*$_2$, SiR*$_2$SiR*$_2$, CR*$_2$CR*$_2$, CR*=CR*, CR*$_2$SiR*$_2$ or GeR*$_2$ wherein R* is as defined above;

p is 0, 1 or 2; and q is 0 or, 1, with the proviso;
that, when p is 2, q is 0, and the formal oxidation state of M is +4 and X (each occurrence) independently represents a substituent having up to 20 non-hydrogen atoms, which is selected from the group consisting of a halogen, a $C_1$–$C_{20}$ hydrocarbon group, a $C_1$–$C_{12}$ hydrocarbyloxy group, a $C_2$–$C_{12}$ di(hydrocarbyl)amido group, a $C_2$–$C_{12}$ di(hydrocarbyl)phosphido group, a $C_1$–$C_{12}$ hydrocarbylsulfido group, a silyl group and combinations thereof;

that, when p is 1, q is 0, and the formal oxidation state of M is +3 and X represents a stabilizing anionic ligand selected from the group consisting of an allyl group, a 2-(N,N-dimethylaminomethyl)-phenyl group and a 2-(N,N-dimethylamino)-benzyl group, or the formal oxidation state of M is +4 and X represents a divalent group derived from a C4–C30 conjugated diene or X and M together form a metallocyclopentene group; and that, when p is 0, q is 1, and the formal oxidation state of M is +2 and X' represents a neutral conjugated or non-conjugated diene having up to 40 carbon atoms, which is unsubstituted or substituted with at least one $C_1$–$C_{12}$ hydrocarbon group and which forms a π-complex in cooperation with M.

Specific examples of (A) components used in the present invention include:

[(N-t-butylamido)(tetramethyl-$\eta^5$-cyclopentadienyl)-1,2-ethanediyl]titanium dimethyl,

[(N-t-butylamido)(tetramethyl-$\eta^5$-cyclopentadienyl) dimethylsilane]titanium dimethyl,

[(N-methylamido)(tetramethyl-$\eta^5$-cyclopentadienyl) dimethylsilane]titanium dimethyl,

[(N-phenylamido)(tetramethyl-$\eta^5$-cyclopentadienyl) dimethylsilane]titanium dimethyl,

[(N-benzylamido)(tetramethyl-$\eta^5$-cyclopentadienyl) dimethylsilane]titanium dimethyl,

[(N-t-butylamido)($\eta^5$-cyclopentadienyl)-1,2-ethanediyl] titanium dimethyl,

[(N-t-butylamido)($\eta^5$-cyclopentadienyl)dimethylsilane] titanium dimethyl,

[(N-methylamido)($\eta^5$-cyclopentadienyl)-1,2-ethanediyl] titanium dimethyl,

[(N-methylamido)($\eta^5$-cyclopentadienyl)dimethylsilane] titanium dimethyl,

[(N-t-butylamido)($\eta^5$-indenyl)dimethylsilane]titanium dimethyl, and

[(N-benzylamido)($\eta^5$-indenyl)dimethylsilane]titanium dimethyl.

Further, specific examples of (A) components used in the present invention also include compounds having the same nomenclatures as those of the above-mentioned specific examples of (A) components except that the term "dimethyl", which appears at the rear end of each nomenclature and appears immediately following the term "titanium" and which corresponds to X" in formula (3) above, is replaced by any of the following terms: "dibenzyl", "2-(N, N-dimethylamino)benzyl", "2-butene-1,4-diyl", "s-trans-$\eta^4$-1,4-diphenyl-1,3-butadiene", "s-trans-$\eta^4$-3-methyl-1,3- pentadiene", "s-trans-$\eta^4$-1,4-dibenzyl-1,3-butadiene", "s-trans-$\eta^4$-2,4-hexadiene", "s-trans-$\eta^4$-1,3-pentadiene", "s-trans-$\eta^4$-1,4-ditolyl-1,3-butadiene", "s-trans-$\eta^4$-1,4-bis(trimethylsilyl)-1,3-butadiene", "s-cis-$\eta^4$-1,4-diphenyl-1,3-butadiene", "s-cis-$\eta^4$-3-methyl-1,3-pentadiene", "s-cis-$\eta^4$-1,4-dibenzyl-1,3-butadiene", "s-cis-$\eta^4$-2,4-hexadiene", "s-cis-$\eta^4$-1,3-pentadiene", "s-cis-$\eta^4$-ditolyl-1,3-butadiene" and "s-cis-$\eta^4$-1,4-bis(trimethylsilyl)-1,3-butadiene".

The transition metal compound (A) used in the present invention can be generally synthesized by a conventional method. As a preferred example of methods for synthesizing the transition metal compound as component (A) used in the present invention, there can be mentioned a method as disclosed in U.S. Pat. No. 5,491,246.

Hereinbelow, explanation is made with respect to a mixture (B) (hereinafter, frequently referred to as "component (B)") used in the present invention. Component (B) is a mixture of:

(B-1) an activator compound (hereinafter, frequently referred to as "component (B-1)") which is present preferably in an amount of 0.5 to 10 times the molar amount of transition metal compound (A), and (B-2) an organometallic compound [hereinafter, frequently referred to as "component (B-2)"] which is present preferably in an amount of 0.05 to 20 times the molar amount of activator compound (B-1), wherein activator compound (B-1) comprises a cation and a noncoordinating, compatible anion, wherein activator compound (B-1) is capable of reacting with transition metal compound (A) to form a metal complex having a catalytic activity.

It is preferred that organometal compound (B-2) is represented by the following formula (1):

$$MR_nX_{m-n} \quad (1)$$

wherein:

M represents an element selected from the group consisting of elements of Groups 1 to 15 of the Periodic Table, R (each occurrence) independently represents a $C_1$–$C_{12}$ linear, branched or cyclic alkyl group or a $C_6$–$C_{20}$ aryl group, X (each occurrence) independently represents a halogen, hydrogen or a $C_1$–$C_{10}$ alkoxy group, m represents a formal oxidation state of M, and n is an integer of from 1 to m, wherein m is as defined above.

In the catalyst used in the method of the present invention, a metal complex is formed by the reaction between components (A) and (B-1), and the metal complex serves as an active species of the catalyst which exhibits high olefin polymerization activity.

In the catalyst used in the method of the present invention, component (C) serves as a carrier to support thereon the above-mentioned active species (i.e., the metal complex formed by the reaction between components (A) and (B-1)).

In the catalyst used in the method of the present invention, component (B-2) serves to form a linkage between the active species and component (C).

It is preferred that the solid component used as component (C) has substantially no hydroxyl group.

With respect to the term "noncoordinating, compatible anion", explanation is made as follows. The term "noncoordinating" means that the anion is incapable of forming a coordinate bond with the transition metal of component (A), or the anion is capable of forming only a weak coordinate bond with the transition metal, so that it is easily displaced by a neutral Lewis base, such as an α-olefin. Further, in the present invention, the "noncoordinating" anion is an anion which, when not forming a coordinate bond with the transition metal (in such a case, the anion functions as a charge balancing anion in the catalyst used in the method of the present invention), will not suffer decomposition, so that neutralization of component (A) in the above-mentioned complex as an active species and formation of neutral by-products due to the decomposition of the anion can be avoided. The term "compatible" means that the anion is such that, even when the activator compound (B-1) decomposes, the anion will not be degraded to neutrality, and that the anion will not harmfully affect the polymerization using the catalyst in the present invention.

Examples of (B-1) components include a compound represented by the following formula (7):

$$[L-H]^{d+}[M^{m+}Q_p]^{d-} \quad (7)$$

wherein:

$[L-H]^{d+}$ represents a proton-donating Brø/nsted acid, wherein

L represents a neutral Lewis base, and d is an integer of from 1 to 7; and $[M^{m+}Qp]^{d-}$ represents a noncoordinating, compatible anion, wherein M represents a metal or metalloid of a Group selected from Groups 5 to 15 of the Periodic Table, Q (each occurrence) is independently selected from the group consisting of hydride, a halogen, a $C_2$–$C_{20}$ dihydrocarbylamido group, a $C_1$–$C_3$ hydrocarbyloxy group, a $C_1$–$C_{30}$ hydrocarbon group and a $C_1$–$C_{40}$ substituted hydrocarbon group, wherein a single Q is optionally a halide, m is an integer of from 1 to 7, p is an integer of from 2 to 14, d is as defined above, and p−m=d.

Preferred examples of (B-1) components used in the present invention include a compound represented by the following formula (8):

$$[L-H]^{d+}[M^{m+}Q_n\{G_q(T-H)_r\}_z]^{d-} \quad (8)$$

wherein:

$[L-H]^{d+}$ represents a proton-donating Brø/nsted acid, wherein

L represents a neutral Lewis base, and d is an integer of from 1 to 7; and $[M^{m+}Q_n\{G_q(T-H)_r\}_z]^{d-}$ represents a noncoordinating, compatible anion, wherein M represents a metal or metalloid of a Group selected from Groups 5 to 15 of the Periodic Table, Q (each occurrence) is independently selected from the group consisting of hydride, a $C_2$–$C_{20}$ dialkylamido group, a $C_1$–$C_{20}$ alkoxide group, a $C_6$–$C_{30}$ aryloxide group, a $C_1$–$C_{30}$ hydrocarbon group, a $C_1$–$C_{40}$ halo-substituted hydrocarbon group and a $C_1$–$C_{40}$ hydrocarbyl- or $C_1$–$C_{40}$ halohydrocarbyl-substituted organometalloid group, wherein a single Q is optionally a halide, G (each occurrence) independently represents a $C_1$–$C_{30}$ multivalent hydrocarbon group having a valence of (r+1), T represents —O—, —S—, —NR— or —PR— wherein R represents hydrogen, a $C_1$–$C_{12}$ hydrocarbyl group, a $C_1$–$C_8$ trihydrocarbylsilyl group or a $C_1$–$C_8$ trihydrocarbylgermanium group, m is an integer of from 1 to 7, n is an integer of from 0 to 7, q is 0 or 1, r is an integer of from 1 to 3, z is an integer of from 1 to 8, d is as defined above, and n+z−m=d.

With respect to the G group in formula (8), when G is a divalent group, it is preferred that the G group is bonded to both M and T.

More preferred examples of (B-1) components used in the present invention include compounds represented by the following formula (9):

$$[L—H]^+[BQ_3Q']^- \qquad (9)$$

wherein:

[L—H]$^+$ represents a proton-donating Brø/nsted acid, wherein

L represents a neutral Lewis base containing carbon, nitrogen, phosphorus or sulfur; and

[BQ$_3$Q']$^-$ represents a noncoordinating, compatible anion, wherein

Q (each occurrence) independently represents a C6–C20 aryl group which is unsubstituted or substituted with at least one substituent selected from the group consisting of a C6–C20 hydrocarbon group and a halogen, and Q' represents a C6–C20 aryl group substituted with a hydroxyl group.

In formula (9) above, it is preferred that L is a compound represented by the following formula:

MR$n$ wherein:

M represents carbon, nitrogen, phosphorus or sulfur;

R (each occurrence) represents hydrogen, a $C_1$–$C_{30}$ linear, branched or cyclic alkyl group, a $C_1$–$C_{20}$ alkoxy group or a $C_6$–$C_{80}$ aryl group, with the proviso that, when two R groups are $C_1$–$C_{30}$ linear or branched alkyl groups, the two alkyl groups are optionally bonded together to form a ring in cooperation with M; and n is 2 or 3, with the proviso:

that, when n is 2, M represents carbon or sulfur, and that, when n is 3, M represents nitrogen or phosphorus.

Specific examples of proton-donating Brø/nsted acids used in the present invention include trialkylammonium cations obtained by replacing three of the four protons of ammonium cation by three alkyl groups, such as triethylammonium, tripropylammonium, tri(n-butyl) ammonium, trimethylammonium, tri(tert-butyl)ammonium, tri(octyl)ammonium, diethylmethylammonium, dibutylmethylammonium, dibutylethylammonium, dihexylmethylammonium, dioctylmethylammonium, didecylmethylammonium, didodecylmethylammonium, ditetradecylmethylammonium, dihexadecylmethylammonium, dioctadecylmethylammoniun, diicosylmethylammonium and bis(hydrogenated tallow alkyl) methylammonium; and N,N-dialkyl anilinium cations, such as N,N-dimethylanilinium, N,N-diethylanilinium, N,N-2,4,6-pentamethylanilinium, and N,N-dimethylbenzylanilinium.

Further examples of proton-donating Brø/nsted acids include dialkylammonium cations, such as di(i-propyl) ammonium and dicyclohexylammonium; triarylphosphonium cations, such as triphenylphosphonium, tri(methylphenyl)phosphonium and tri(dimethylphenyl)phosphonium; dialkylsulfonium cations, such as dimethylsulfonium and diethylsulfonium; and diarylsulfonium cations, such as diphenylsulfonium. Specific examples of noncoordinating, compatible anions used in the present invention include:

triphenyl(hydroxyphenyl)borate;

diphenyldi(hydroxyphenyl)borate;

triphenyl(2,4-dihydroxyphenyl)borate;

tri(p-tolyl)(hydroxyphenyl)borate;

tris(pentafluorophenyl)(hydroxyphenyl)borate;

tris(2,4-dimethylphenyl)(hydroxyphenyl)borate;

tris(3,5-dimethylphenyl)(hydroxyphenyl)borate;

tris(3,5-di-trifluoromethylphenyl)(hydroxyphenyl)borate;

tris(pentafluorophenyl)(2-hydroxyethyl)borate;

tris(pentafluorophenyl)(4-hydroxybutyl)borate;

tris(pentafluorophenyl)(4-hydroxycyclohexyl)borate;

tris(pentafluorophenyl)[4-(4'-hydroxyphenyl)phenyl] borate; and tris(pentafluorophenyl)(6-hydroxy-2-naphthyl)borate.

Among these borate compounds, tris(pentafluorophenyl) (hydroxyphenyl)borate is most preferred.

Other specific examples of noncoordinating, compatible anions which can be used in the present invention include borate compounds obtained by replacing hydroxyl groups in the above-mentioned specific examples of borate compounds by an —NHR group wherein R represents a methyl group, an ethyl group or a tert-butyl group. In the present invention, it is preferred that component (B-1) is used in an amount of 0.5 to 10 times the molar amount of component (A). It is more preferred that the molar amount of component (B-1) is 0.8 to 5 times, more advantageously 1 to 2 times the molar amount of component (A).

In the present invention, it is preferred that organometal compound (B-2) (hereinafter, frequently referred to as "component (B-2)") is represented by the following formula (1):

$$MR_nX_{m-n} \qquad (1)$$

wherein:

M represents an element selected from the group consisting of elements of Groups 1 to 15 of the Periodic Table, R (each occurrence) independently represents a $C_1$–$C_{12}$ linear, branched or cyclic alkyl group or a $C_6$–$C_{20}$ aryl group, X (each occurrence) independently represents a halogen, hydrogen or a $C_1$–$C_{10}$ alkoxy group;

m represents a formal oxidation state of M; and n is an integer of from 1 to m, wherein m is as defined above.

With respect to component (B-2) used in the present invention, it is more preferred that:

M in formula (1) represents an element selected from the group consisting of elements of Groups 2 and 13 to 15 of the Periodic Table; and R, X, m and n in formula (1) are as defined above for formula (1).

Component (B-2) may be a mixture of a plurality of types of compounds represented by formula (1).

Most preferred-examples of component (B-2) used in the present invention include organ aluminum compounds represented by the following formula (10):

$$AlR_nX_{3-n} \qquad (10)$$

wherein

R (each occurrence) independently represents a $C_1$–$C_{12}$ linear, branched or cyclic alkyl group or a $C_6$–$C_{20}$ aryl group;

X (each occurrence) independently represents a halogen, hydrogen or a $C_1$–$C_{10}$ alkoxy group; and n is 1, 2 or 3.

Examples of R groups in formula (10) representing a preferred form of component (B-2) include a methyl group, an ethyl group, a butyl group, a hexyl group, an octyl group, a decyl group, a phenyl group and a tolyl group. Examples of X groups in formula (10) representing a preferred form of component (B-2) include a methoxy group, an ethoxy group, a butoxy group and a chlorine atom.

Specific examples of (B-2) components used in the present invention include trialkylaluminum, such as trimethylaluminum, triethylaluminum, tributylaluminum, trihexylaluminum, trioctylaluminum and tridecylaluminum, and reaction products of these trialkylaluminum compounds with an alcohol, such as methyl alcohol, ethyl alcohol, butyl alcohol, pentyl alcohol, hexyl alcohol, octyl alcohol, decyl alcohol or the like. Examples of such reaction products include methoxydimethylaluminum, ethoxydiethylaluminum and butoxydibutylaluminum. In the production of such reaction products, it is preferred that the mixing ratio between a trialkylaluminum and an alcohol is in the range of from 0.3 to 20, more advantageously from 0.5 to 5, still more advantageously from 0.8 to 3 in terms of the Al/OH ratio. As typical examples of reaction products obtained by reacting an alkylaluminum and an alcohol at a mixing ratio of 1 in terms of the Al/OH molar ratio, there can be mentioned methoxydimethylaluminum, ethoxydimethylaluminum, ethoxydiethylaluminum and the like. In the present invention, preferred examples of (B-2) components include trimethylaluminum, triethylaluminum or tributylaluminum.

In the present invention, it is preferred that the molar amount of component (B-2) is 0.05 to 20 times the molar amount of component (B-1). It is more preferred that component (B-2) is used in an amount 0.07 to 2 times, more advantageously 0.1 to 1 time, most advantageously 0.2 to 0.8 time the molar amount of component (B-1).

In the present invention, component (B) (which is obtained by mixing and contacting components (B-1) and (B-2) with each other in a specific molar ratio) can be securely carried on component (C). For increasing the security of carrying of component (B) on component (C), it is desired that component (B) is a reaction mixture obtained by reacting component (B-1) and component (B-2) with each other, rather than a simple mixture of components (B-1) and (B-2). Specifically, when component (B-1) is a compound represented by formula (8) above, component (B-1) has 1 to 3 T—H groups (such as a hydroxyl group as in the case of formula (9)) therein, and hence can be reacted with an organoaluminum compound (e.g., trialkylaluminum) which is a preferred example of component (B-2), thereby producing a reaction mixture wherein a part or all of component (B-1) has reacted with component (B-2). The proportion of component (B-1) reacted with component (B-2) can be easily controlled by changing the mixing ratio of components (B-1) and (B2). For example, when component (B-1) has one T—H group (such as a hydroxyl group), components (B-1) and (B-2) may react with each other at a (B-1)/(B-2)) molar ratio of 1 or more, depending on the number of the reactive organic, group(s) in component (B-2). When the molar amount of component (B-1) is the same as or smaller than a threshold amount at which all the reactive organic group(s) in component (B-2) are consumed by the reaction with component (B-1), all of component (B-1) reacts with component (B-2). When the molar amount of component (B-1) is larger than a threshold amount at which all the reactive organic group(s) in component (B-2) are consumed by the reaction with component (B-1), a part of component (B-1) remains unreacted with component (B-2). When component (B) is a reaction mixture obtained by reacting a part or all of component (B-1) with component (B-2), component (B) can be very securely carried on component (C).

In the production of the catalyst used in the method of the present invention, component (B) can be securely carried on component (C), and, then, component (A) can be securely carried on component (C) through component (B). Alternatively, the production of the catalyst used in the method of the present invention can also be performed by a method in which component (A) is first contacted with component (B) to obtain a complex of components (A) and (B), and the obtained complex is then contacted with component (C), thereby causing component (A) to be securely carried on component (C) through component (B).

In the present invention, component (C) (i.e., solid component preferably having substantially no hydroxyl group) is used for supporting thereon components (A) and (B) which together form a catalytically active species.

Component (C) having substantially no hydroxyl group can be obtained by subjecting a solid substance (hereinafter, frequently referred to as a "precursor of component (C)") to the below-described treatment for removing the hydroxyl groups from the surface of the precursor of component (C).

Examples of precursors of component (C) include porous polymer materials, wherein the matrix thereof comprises, e.g., polyethylene, polypropylene or a styrene-divinylbenzene copolymer; and inorganic solid oxides of elements of Groups 2 to 4, 13 and 14 of the Periodic Table, such as silica, alumina, magnesia, magnesium chloride, zirconia, titania, boron oxide, calciumoxide, zinc oxide, barium oxide, vanadium(V) oxide, chromium oxide, thorium oxide, mixtures thereof and oxide complexes thereof. Examples of oxide complexes containing silica include oxide complexes of silica and an oxide of an element selected from elements of Group 2 or 13 of the Periodic Table, such as silica-magnesia and silica-alumina. In the present invention, it is preferred that the precursor of component (C) is selected from silica, alumina and oxide complexes of silica and an oxide of an element selected from elements of Group 2 or 13 of the Periodic Table. Among these inorganic solid oxides, especially preferred is silica.

With respect to the morphology of a silica product used as a precursor of component (C), there is no particular limitation, and the silica may be in granular, spherical, agglomerated or fumed or any other form. Preferred examples of commercially available silica products include SD 3216.30, SP-9-10046, Davison Syloid™ 245, Davison 948 and Davison 952 (all of which are manufactured and sold by Grace Davison (a division of W. R. Grace & Co., USA)); Aerosil 812 (manufactured and sold by Deggusa AG, Germany); ES70X (manufactured and sold by Crossfield, USA); and P-6 and P-10 (both manufactured and sold by Fuji Silysia Chemical. Ltd., Japan).

It is preferred that component (C) used in the present invention has a specific surface area of from 10 to 1,000 m2/g, more advantageously 100 to 600 m2/g, as determined by nitrogen porosimetry using the Brunauer-Emmett-Teller (B.E.T.) method. A representative example of component (C) having such a high specific surface area is component (C) comprised of a porous material having a large number of pores.

In the present invention, the porosity of component (C) is generally 5 cm$^3$/g or less, preferably 0.1 to 3 cm$^3$/g, more preferably 0.2 to 2 cm$^3$/g, as determined by nitrogen porosimetry.

With respect to the average particle size of component (C) used in the present invention, there is no particular limitation. The average particle size of component (C) is generally from 0.5 to 500 µm, preferably from 1 to 200 µm, more preferably from 5 to 100 µm.

In the present invention, component (C) having substantially no hydroxyl group can be obtained by subjecting the precursor of component (C) to chemical treatment so as to remove the hydroxyl groups from the surface of the precursor of component (C).

Further, in the present invention, it is preferred that the precursor of component (C) is subjected to heat treatment so as to remove water (such as crystalline water or adsorbed water). The heat treatment of the precursor of component (C) can be performed, for example, at a temperature of from 150° C. to 1,000° C., preferably from 250° C. to 800° C., in an inert atmosphere or reductive atmosphere for 1 hour to 50 hours.

In the present invention, it is more preferred that after the heat treatment for dehydration, the precursor of component (C) is further subjected to a chemical treatment so as to remove the hydroxyl groups from the surface of the precursor of component (C) to obtain component (C).

With respect to the chemical treatment conducted for removing the hydroxyl groups from the precursor of component (C), it is recommended to employ a chemical treatment in which the precursor of component (C) is contacted with an organometallic compound. Examples of organometallic compounds used for the chemical treatment include compounds of elements of Groups 2 to 13 of the Periodic Table. Among these compounds, especially preferred are organoaluminum compounds and organomagnesium compounds.

A preferred example of the organoaluminum compound used in the chemical treatment of the precursor of component (C) is represented by the following formula (10):

$$\text{AlR}n\text{X}3-n \qquad (10)$$

wherein
R (each occurrence) independently represents a C$_1$–C$_{12}$ linear, branched or cyclic alkyl group or a C$_6$–C$_{20}$ aryl group;
X (each occurrence) independently represents a halogen, hydrogen or a C$_1$–C$_{10}$ alkoxy group; and
n is 1, 2 or 3.

The compounds represented by formula (10) above may be used individually or in combination.

Examples of R groups in formula (10) (representing a preferred form of the organoaluminum compound used in the chemical treatment of the precursor of component (C)) include a methyl group, an ethyl group, a propyl group, a butyl group, a hexyl group, an octyl group, a decyl group, a phenyl group and a tolyl group. Examples of X groups in formula (10) (representing a preferred form of the organoaluminum compound used in the chemical treatment of the precursor of component (C)) include a methoxy group, an ethoxy group, a butoxy group, a hydrogen atom and a chlorine atom.

Specific examples of organoaluminum compounds used in the chemical treatment of the precursor of component (C) include trialkylaluminum, such as trimethylaluminum, triethylaluminum, tributylaluminum, trihexylaluminum, trioctylaluminum and tridecylaluminum; and reaction products of these trialkylaluminum compounds with an alcohol, such as methyl alcohol, ethyl alcohol, butyl alcohol, pentyl alcohol, hexyl alcohol, octyl alcohol, decyl alcohol or the like. Examples of such reaction products include methoxydimethylaluminum, ethoxydiethylaluminum and butoxydibutylaluminum. In the production of such reaction products, it is preferred that the ratio of the trialkylaluminum to the alcohol is in the range of from 0.3 to 20, more advantageously from 0.5 to 5, still more advantageously from 0.8 to 3 in terms of the Al/OH molar ratio.

A preferred example of the organomagnesium compound used in the chemical treatment of the precursor of component (C) is represented by the following formula (11):

$$\text{MgR}n\text{X}2-n \qquad (11)$$

wherein
R (each occurrence) independently represents a C$_1$–C$_{12}$ linear, branched or cyclic alkyl group or a C$_8$–C$_{20}$ aryl group;
X (each occurrence) independently represents a halogen, hydrogen or a C$_1$–C$_{10}$ alkoxy group; and
n is 1 or 2.

The compounds represented by formula (11) above may be used individually or in combination.

Examples of R groups in formula (11) (representing a preferred form of the organomagnesium compound used in the chemical treatment of the precursor of component (C)) include a methyl group, an ethyl group, a propyl group, a butyl group, a hexyl group, an octyl group, a decyl group, a phenyl group and a tolyl group. Examples of X groups in formula (11) (representing a preferred form of the organomagnesium compound used in the chemical treatment of the precursor of component (C)) include a methoxy group, an ethoxy group, a butoxy group, a hydrogen atom and a chlorine atom.

Specific examples of organomagnesium compounds used in the chemical treatment of the precursor of component (C) include diethylmagnesium, dibutylmagnesium, butylethylmagnesium and butyloctylmagnesium.

In the chemical treatment of the precursor of component (C), the above-mentioned organoaluminum compound and the above mentioned organomagnesium compound may be used in the form of a mixture thereof.

In the present invention, if desired, organoaluminum compound (D) (hereinafter, frequently referred to as "optional component (D)") is optionally used in the catalyst.

By using optional component (D) in the catalyst used in the method of the present invention, an active species formed by components (A) and (B) can be more securely supported on component (C) by physical adsorption.

The use of optional component (D) is especially preferred when component (B) contains unreacted component (B-1). In such a case, by the use of optional component (D), it becomes possible to surely prevent the active species from being bonded to component (C) by chemical bonding.

A preferred example of optional component (D) is represented by the following formula (10):

$$\text{AlR}n\text{X}3-n \qquad (10)$$

wherein
R (each occurrence) independently represents a C$_1$–C$_{12}$ linear, branched or cyclic alkyl group or a C$_6$–C$_{20}$ aryl group;

X (each occurrence) independently represents a halogen, hydrogen or a $C_1$–$C_{10}$ alkoxy group; and n is 1, 2 or 3.

Optional component (D) may be a mixture of a plurality of types of compounds represented by formula (10) above.

Examples of R groups in formula (10) representing a preferred form of component (D) include a methyl group, an ethyl group, a propyl group, a butyl group, a hexyl group, an octyl group, a decyl group, a phenyl group, a hydrogen atom and a tolyl group. Examples of X groups in formula (10) representing a preferred form of component (D) include a methoxy group, an ethoxy group, a butoxy group, a hydrogen atom and a chlorine atom.

Specific examples of (D) components used in the present invention include trialkylaluminum, such as trimethylaluminum, triethylaluminum, tributylaluminum, trihexylaluminum, trioctylaluminum and tridecylaluminum; and reaction products of these trialkylaluminum compounds with an alcohol, such as methyl alcohol, ethyl alcohol, butyl alcohol, pentyl alcohol, hexyl alcohol, octyl alcohol, decyl alcohol or the like. Examples of such reaction products include methoxydimethylaluminum, ethoxydiethylaluminum and butoxydibutylaluminum. In the production of such reaction products, it is preferred that the ratio of the trialkylaluminum to the alcohol is in the range of from 0.3 to 20, more advantageously from 0.55 to 5, still more advantageously from 0.8 to 3 in terms of the Al/OH molar ratio.

In the present invention, when optional component (D) is used, the molar amount of component (D) is 0.01 to 1,000 times, preferably 0.1 to 100 times, more preferably 1 to 10 times the molar amount of component (B-1).

With respect to the method for producing the catalyst used in the method of the present invention, the catalyst can be obtained by contacting components (A) and (B-1), and optionally component(B-2), (C) and component (D).

With respect to the specific method for producing the catalyst used in the method of the present invention, there is no particular limitation. Examples of specific methods for producing the catalyst used in the method of the present invention include:

(a) a method comprising the steps of:
  (i) intimately mixing and contacting components (B-1) and (B-2) with each other to form component (B),
  (ii) intimately mixing and contacting components (A) and (B) with each other to thereby obtain a mixture of components (A) and (B), and
  (iii) intimately mixing and contacting the obtained mixture of components (A) and (B), and component (C) with each other,
  wherein component (D) may be optionally added at any time after the step (i); and (b) a method comprising the steps of:
  (i) intimately mixing and contacting components (B-1) and (B-2) with each other to form component (B),
  (ii) intimately mixing and contacting component (B) and component (C) with each other to thereby obtain a mixture of components (B) and (C), and
  (iii) intimately mixing and contacting component (A) and the obtained mixture of components (B) and (C) with each other,
  wherein component (D) may be optionally added at any time after the step (i).

In addition to the above-mentioned components for the metallocene catalyst used in the present invention, other components which are advantageous for olefin polymerization maybe contained in the catalyst. As examples of such additional components for the catalyst, there may be mentioned aromatic ester compounds, such as ethyl benzoate.

Moreover, with respect to a Lewis acid, which may be used instead of hydrogen gas, examples of the Lewis acid include carbon monoxide, carbon dioxide, oxygen, nitrogen oxide, $H_2O$, aldehydes, ketones, carboxylic acids, amines, amides and nitrites.

BEST MODE FOR CARRYING OUT THE INVENTION

Hereinbelow, the present invention will be described in more detail with reference to the following Examples and Comparative Examples, which should not be construed as limiting the scope of the present invention.

EXAMPLE 1

Copolymerization of ethylene with 1-butene was performed by continuous slurry polymerization as follows.

There was provided a 200 liter vessel-type polymerizer equipped with an agitator and having connected thereto a catalyst transfer pipe, a monomer mixture feeding pipe and a slurry withdrawal pipe. The catalyst transfer pipe had, connected to a side wall thereof, a branched-conduit for feeding hydrogen gas into the catalyst transfer pipe. As a catalyst, use was made of a metallocene catalyst comprised of a triethylaluminum-treated silica carrier having supported thereon a catalytically active species:comprising a mixture of {(N-t-butylamido)(tetramethyl-$\eta^5$-cyclopentadienyl)dimethylsilane}titanium 1,3-pentadiene, bis(hydrogenated tallow alkyl) methylammonium, tris(pentafluorophenyl) (4-hydroxyphenyl) borate and methylaluminoxane. Into the above vessel-type polymerizer were continuously introduced a monomer mixture of ethylene and 1-butene, hexane (as a polymerization reaction medium), hydrogen gas (having a purity of 99.99 or more % by mole) and the above metallocene catalyst so that a desired ethylene polymer, i.e., an ethylene/1-butene copolymer was continuously produced at a production rate of 10 kg/hr.

More specifically, the polymerization reaction was performed as follows.

With respect to the metallocene catalyst and the hydrogen gas, introduction thereof into the polymerizer was conducted by a method in which they were mixed with each other and the resultant mixture was transferred to the polymerizer through the catalyst transfer pipe. That is, the hexane (which was used as a polymerization reaction medium) was also used as a catalyst transfer medium. The introduction rate of the hexane was maintained at 60 liter/hr.

The hydrogen gas was fed into the hydrogen gas feeding branched-conduit connected to the side wall of the catalyst transfer pipe, at a flow rate of 18 NL/hr (NL means L (liter) as measured under normal temperature and pressure conditions, namely at 0° C. under 1 atm.). This flow rate of the hydrogen gas corresponds to an amount necessary for obtaining an ethylene/1-butene copolymer having a desired molecular weight which is determined by measuring the melt index of the produced copolymer. The hydrogen gas fed into the hydrogen gas feeding branched-conduit was allowed to flow into the catalyst transfer pipe through which the mixture of the metallocene catalyst and the hexane was transferred to the polymerizer. Thus, the catalyst was contacted with the hydrogen gas during the transfer of the catalyst to the polymerizer.

The monomer mixture of ethylene and 1-butene was fed through the monomer mixture feeding pipe.

During the copolymerization, the reaction temperature was maintained at 70° C., and the reaction pressure was maintained at 10 Kg/cm²-G. The flow rate of 1-butene was so controlled that the concentration of 1-butene in the gaseous phase in the polymerizer was maintained at 0.1% by mole, based on the total mole of ethylene and 1-butene.

The concentration of ethylene and that of 1-butene of the gaseous phase in the polymerizer were measured by means of on-line gas chromatography.

The resultant slurry (liquid phase) of the produced copolymer was continuously withdrawn from the polymerizer through the slurry withdrawal pipe so that the amount of the slurry contained in the polymerizer was maintained constant. The withdrawn slurry was continuously transferred to a subsequent drying step.

The continuous operation of the copolymerization was stably performed without the need for any interruption of the operation because no clogging of the slurry withdrawal pipe occurred. After completion of the continuous operation of the copolymerization, the inside of the polymerizer was examined. No indefinite form of polymer was observed.

The reaction conditions and results of the copolymerization are shown in Table 1.

COMPARATIVE EXAMPLE 1

Substantially the same copolymerization as in Example 1 was performed except that the hydrogen gas was directly fed into the gaseous phase in the polymerizer at a flow rate of 18 NL/hr, instead of feeding the hydrogen gas into the hydrogen gas feeding branched conduit connected to the side wall of the catalyst transfer pipe. That is, the catalyst was not contacted with the hydrogen gas before the introduction of the catalyst into the polymerizer.

After the start of the copolymerization, a clogging of the slurry withdrawal pipe occurred, thus rendering it impossible to control the amount of the slurry contained in the polymerizer, so that it became necessary to shut down the continuous polymerization process. After the shutdown of the continuous operation of the copolymerization, the inside of the slurry withdrawal pipe was examined. Adherence of a number of indefinite forms of polymer to the inner wall of the pipe was observed.

The reaction conditions and results of the copolymerization are shown in Table 1.

EXAMPLE 2

Using the same vessel-type polymerizer and the same metallocene catalyst as used in Example 1, copolymerization of ethylene with 1-butene was performed by continuous slurry polymerization as follows.

Into the vessel-type polymerizer were continuously introduced a monomer mixture of ethylene and 1-butene, hexane (as a polymerization reaction medium), hydrogen gas (having a purity of 99.99 or more % by mole) and the metallocene catalyst so that an ethylene/1-butene copolymer was continuously produced at a production rate of 10 kg/hr.

More specifically, the polymerization reaction was performed as follows. With respect to the metallooene catalyst and the hydrogen gas, introduction thereof into the polymerizer was conducted by a method in which they were mixed with each other and the resultant mixture was transferred to the polymerizer through the catalyst transfer pipe. That is, the hexane (which was used as a polymerization reaction medium) was also used as a catalyst transfer medium. The introduction rate of the hexane was maintained at 60 liter/hr.

The hydrogen gas was fed at a flow rate of 20 NL/hr into the hydrogen gas feeding branched-conduit connected to the side wall of the catalyst transfer pipe. This flow rate of the hydrogen gas corresponds to an amount necessary for obtaining an ethylene/1-butene copolymer having the desired molecular weight, which is determined by measuring the melt index of the produced copolymer. The hydrogen gas fed into the hydrogen gas feeding branched-conduit was allowed to flow into the catalyst transfer pipe through which the mixture of the metallocene catalyst and the hexane was transferred to the polymerizer. Thus, the catalyst was contacted with the hydrogen gas during the transfer of the catalyst to the polymerizer.

The monomer mixture of ethylene and 1-butene was fed through the monomer mixture feeding pipe. During the copolymerization, the reaction temperature was maintained at 70° C., and the reaction pressure was maintained at 10 Kg/cm²-G. The flow rate of 1-butene was so controlled that the concentration of 1-butene in the gaseous phase in the polymerizer was maintained at 0.3% by mole, based on the total moles of ethylene and 1-butene.

The concentration of ethylene and that of 1-butene of the gaseous phase in the polymerizer were measured by means of on-line gas chromatography.

The resultant slurry (liquid phase) of the produced copolymer was continuously withdrawn from the polymerizer through the slurry withdrawal pipe so that the amount of the slurry contained in the polymerizer was maintained constant. The withdrawn slurry was continuously transferred to a subsequent drying step.

The continuous operation of the copolymerization was stably performed without the need for any interruption of the operation because no clogging of the slurry withdrawal pipe occurred. After completion of the continuous operation of the copolymerization, the inside of the polymerizer was examined. No indefinite form of polymer was observed.

The reaction conditions and results of the copolymerization are shown in Table 1.

COMPARATIVE EXAMPLE 2

Substantially the same copolymerization as in Example 2 was performed except that the hydrogen gas was directly fed into the gaseous phase in the polymerizer at a flow rate of 20 NL/hr, instead of feeding the hydrogen gas into the hydrogen gas feeding branched conduit connected to the side wall of the catalyst transfer pipe. That is, the catalyst was not contacted with the hydrogen gas before the introduction of the catalyst into the polymerizer.

After the start of the copolymerization, a clogging of the slurry withdrawal pipe occurred, thus rendering it impossible to control the amount of the slurry contained in the polymerizer, so that it became necessary to shut down the continuous polymerization process. After the shutdown of the continuous operation of the copolymerization, the inside of the slurry withdrawal pipe was examined. Adherence of a number of indefinite forms of polymer to the inner wall of the pipe was observed.

The reaction conditions and results of the copolymerization are shown in Table 1.

EXAMPLE 3

Substantially the same copolymerization as in Example 2 was performed except that the flow rate of the hydrogen gas fed into the hydrogen gas feeding branched-conduit (connected to the side wall of the catalyst transfer pipe) was changed to 10 NL/hr and that hydrogen gas was also directly fed into the gaseous phase in the polymerizer at a flow rate of 9 NL/hr. The total amount of the hydrogen gas (19 NL/hr) corresponds to an amount necessary for obtaining an ethylene/1-butene copolymer having a desired molecular weight which is determined by measuring the melt index of the produced copolymer.

The resultant slurry (liquid phase) of the produced copolymer was continuously withdrawn from the polymerizer through the slurry withdrawal pipe so that the amount of the slurry contained in the polymerizer was maintained constant. The withdrawn slurry was continuously transferred to a subsequent drying step.

The continuous operation of the copolymerization was stably performed without the need for any interruption of the operation because no clogging of the slurry withdrawal pipe occurred. After completion of the continuous operation of the copolymerization, the inside of the polymerizer was examined. No indefinite form of polymer was observed.

The reaction conditions and results of the copolymerization are shown in Table 1.

EXAMPLE 4

Substantially the same copolymerization as in Example 1 was performed except that the flow rate of the hydrogen gas fed into the hydrogen gas feeding branched-conduit (connected to the side wall of the catalyst transfer pipe) was changed to 4 NL/hr and that hydrogen gas was also directly fed into the gaseous phase in the polymerizer at a flow rate of 10 NL/hr. The total amount of the hydrogen gas (14 NL/hr) corresponds to an amount necessary for obtaining an ethylene/1-butene copolymer having a desired molecular weight which is determined by measuring the melt index of the produced copolymer.

The resultant slurry (liquid phase) of the produced copolymer was continuously withdrawn from the polymerizer through the slurry withdrawal pipe so that the amount of the slurry contained in the polymerizer was maintained constant. The withdrawn slurry was continuously transferred to a subsequent drying step.

The continuous operation of the copolymerization was stably performed without the need for any interruption of the operation because no clogging of the slurry withdrawal pipe occurred. After completion of the continuous operation of the copolymerization, the inside of the polymerizer was examined. No indefinite form of polymer was observed.

The reaction conditions and results of the copolymerization are shown in Table 1.

EXAMPLE 5

Substantially the same copolymerization as in Example 1 was performed except that the flow rate of the hydrogen gas fed into the hydrogen gas feeding branched-conduit (connected to the side wall of the catalyst transfer pipe) was changed to 1.5 NL/hr and that hydrogen gas was also directly fed into the gaseous phase in the polymerizer at a flow rate of 13 NL/hr. The total amount of the hydrogen gas (14.5 NL/hr) corresponds to an amount necessary for obtaining an ethylene/1-butene copolymer having a desired molecular weight which is determined by measuring the melt index of the produced copolymer.

The resultant slurry (liquid phase) of the produced copolymer was continuously withdrawn from the polymerizer through the slurry withdrawal pipe so that the amount of the slurry contained in the polymerizer was maintained constant. The withdrawn slurry was continuously transferred to a subsequent drying step. The continuous operation of the copolymerization was stably performed without the need for any interruption of the operation because no clogging of the slurry withdrawal pipe occurred. After completion of the continuous operation of the copolymerization, the inside of the polymerizer was examined. No indefinite form of polymer was observed.

The reaction conditions and results of the copolymerization are shown in Table 1.

TABLE 1

| | Reaction temperature (° C.) | (1-butene)/(ethylene + 1-butene x) 100 (mol %) | Properties of the produced copolymer | | Introduction rate of catalyst | | Flow rate of hydrogen gas[3] fed into the catalyst transfer pipe | | Molar ratio of hydrogen gas to titanium[4] | Flow rate of hydrogen gas directly fed into polymerizer (NL/hr) | Indefinite forms of polymer in polymerizer | Continuous production ability |
|---|---|---|---|---|---|---|---|---|---|---|---|---|
| | | | MI[1] | Density (g/cm³) | (g/hr) | [mol (Ti)/hr][2] | (NL/hr) | (mol/hr) | | | | |
| Example 1 | 70 | 0.1 | 2.3 | 0.953 | 4.17 | 0.00025 | 18 | 0.804 | 3,216 | 0 | Not observed | No pipe-clogging |
| Example 2 | 70 | 0.3 | 3.4 | 0.945 | 4.35 | 0.00026 | 20 | 0.893 | 3,434 | 0 | Not observed | No pipe-clogging |
| Example 3 | 70 | 0.3 | 2.8 | 0.945 | 3.57 | 0.00021 | 10 | 0.446 | 2,124 | 9 | Not observed | No pipe-clogging |
| Example 4 | 70 | 0.1 | 3.0 | 0.953 | 3.23 | 0.00019 | 4 | 0.179 | 942 | 10 | Not observed | No pipe-clogging |
| Example 5 | 70 | 0.1 | 3.5 | 0.953 | 4.55 | 0.00027 | 1.5 | 0.067 | 248 | 13 | Not observed | No pipe-clogging |
| Comparative Example 1 | 70 | 0.1 | 3.4 | 0.953 | 3.57 | 0.00021 | 0 | 0.000 | 0 | 18 | Observed | Pipe-clogging occurs |

TABLE 1-continued

| | Reaction temperature (° C.) | (1-butene)/ (ethylene + 1-butene x) 100 (mol %) | Properties of the produced copolymer | | Introduction rate of catalyst | Flow rate of hydrogen gas[3] fed into the catalyst transfer pipe | | Molar ratio of hydrogen gas to titanium[4] | Flow rate of hydrogen gas directly fed into polymerizer (NL/hr) | Indefinite forms of polymer in polymerizer | Continuous production ability |
|---|---|---|---|---|---|---|---|---|---|---|---|
| | | | MI[1] | Density (g/cm³) | (g/hr) | [mol (Ti)/ hr][2] | (NL/hr) | (mol/hr) | | | | |
| Comparative Example 2 | 70 | 0.3 | 3.9 | 0.945 | 2.50 | 0.00015 | 0 | 0.000 | 0 | 20 | Observed | Pipe-clogging occurs |

Note 1) MI: Melt Index.
Note 2) The value of "mol(Ti)/hr" for the catalyst means the molar amount of the catalyst introduced per hour, in terms of the molar amount of titanium (transition metal) contained in the catalyst.
Note 3) Purity: 99.99 mol % or more.

Note 4) Molar ratio of hydrogen gas to titanium $= \dfrac{[\text{Value of ``mol/hr'' for the hydrogen gas}] \times 0.9999}{[\text{Value of ``mol (Ti)/hr'' for the catalyst}]}$

[In the above equation, since the purity of the hydrogen gas is 99.99 mol %, the value of "mol/hr" for the hydrogen gas (i.e., the molar amount of the hydrogen gas fed into the catalyst transfer pipe) is multiplied by (99.99 + 100 = ) 0.9999.]

INDUSTRIAL APPLICABILITY

The method of the present invention is advantageous in that production of an olefin homopolymer or an olefin copolymer by continuous slurry polymerization or continuous gaseous phase polymerization in the presence of a metallocene catalyst can be stably performed without the disadvantageous occurrence of indefinite forms of polymer. That is, by the method of the present invention, a pipe for withdrawing a produced polymer from a polymerizer can be prevented from being clogged with indefinite forms of polymer, so that an olefin homopolymer or an olefin copolymer can be stably and efficiently produced by a continuous operation of a commercial scale plant.

What is claimed is:

1. A method for producing an olefin homopolymer or an olefin copolymer from an olefin or an olefin and at least one comonomer copolymerizable therewith by continuous slurry polymerization or continuous gaseous phase polymerization in the presence of a metallocene catalyst, wherein said method comprises:

(1) providing a polymerizer; and (2) transferring said catalyst to said polymerizer and introducing said catalyst into said polymerizer while continuously feeding said olefin or continuously feeding said olefin and said comonomer into said polymerizer, to thereby effect a homopolymerization of said olefin or a copolymerization of said olefin and said comonomer, wherein, prior to homopolymerization of said olefin in the polymerizer by said catalyst or copolymerization of said olefin and said comonomer in the polymerizer by said catalyst, said catalyst is subjected to hydrogen gas-treatment in which said catalyst is contacted with hydrogen gas not substantially containing olefin, wherein said polymerizer has a catalyst transfer pipe connected thereto and said catalyst is transferred together with a catalyst transfer medium which is flowed in said catalyst transfer pipe, and wherein said hydrogen gas-treatment of the catalyst is performed by introducing hydrogen gas into the catalyst transfer medium to thereby contact the catalyst with hydrogen gas during the transfer of the catalyst through the catalyst transfer pipe.

2. The method according to claim 1, wherein said catalyst comprises:

(A) a transition metal compound comprising a transition metal having η-bonded thereto a cyclic anionic ligand, (B) an activator compound (B-1) comprising a cation and a noncoordinating, compatible anion and being capable of reacting with transition metal compound (A) to form a metal complex having a catalytic activity, and optionally an organometallic compound (B-2), optionally (C) a solid component, and optionally (D) an organoaluminum compound.

3. The method according to claim 2, wherein, in said hydrogen gas-treatment of the catalyst, said hydrogen gas is used in an amount of 0.5 to 50,000 times the molar amount of said transition metal compound (A), wherein said amount of the hydrogen gas is defined in terms of the molar amount of the hydrogen molecules contained in said hydrogen gas.

4. The method according to claim 1, wherein said catalyst transfer pipe includes a conduit connected to a side wall thereof for feeding hydrogen gas into the catalyst transfer pipe, and wherein said introduction of hydrogen gas into the catalyst transfer medium is performed by feeding hydrogen gas into the catalyst transfer pipe through said conduit.

5. The method according to claim 4, wherein said conduit for feeding hydrogen gas into the catalyst transfer pipe is connected to the catalyst transfer pipe in said polymerizer.

6. The method according to claim 1 or claim 2, wherein said hydrogen gas used for said hydrogen gas-treatment of the catalyst has a purity of 99.99% by mole or more.

7. The method according to claim 1 or claim 2, wherein said olefin is selected from the group consisting of ethylene and $C_3$–$C_{20}$ α-olefins.

* * * * *